April 4, 1950 R. M. SOMERS 2,503,176

SIGNALING MEANS FOR TELEPHONE RECORDING APPARATUS

Filed Oct. 31, 1946 2 Sheets-Sheet 1

INVENTOR
Richard M. Somers
By Henry Lanahan
ATTORNEY

April 4, 1950 R. M. SOMERS 2,503,176

SIGNALING MEANS FOR TELEPHONE RECORDING APPARATUS

Filed Oct. 31, 1946 2 Sheets-Sheet 2

INVENTOR
Richard M. Somers
By Henry Lanahan
ATTORNEY

Patented Apr. 4, 1950 2,503,176

UNITED STATES PATENT OFFICE 2,503,176

SIGNALING MEANS FOR TELEPHONE RECORDING APPARATUS

Richard M. Somers, West Orange, N. J., assignor to Thomas A. Edison, Incorporated, West Orange, N. J., a corporation of New Jersey Application October 31, 1946, Serial No. 706,849

4 Claims. (Cl. 179—6)

My invention relates to signaling means for warning the users of telephone systems when their conversations are being recorded.

It is an object of my invention to provide a signaling means which is controlled automatically to impress a suitable warning signal on a telephone line when the conversations transmitted on that line are being recorded.

It is another object to render the signaling means effective as an incident to placing the recording mechanism into effective condition for recording telephone conversations.

It is another object to place concurrently both the recording mechanism and signaling means into effective condition as an incident of using the telephone apparatus.

It is another object to place the signaling means into effective condition as an incident of selectively connecting a dictating machine to a telephone system.

It is another object to provide novel and effective means for feeding the warning signal into the telephone line. In this connection it is a particular object to feed the warning signal to the telephone line through a pickup coil which is inductively coupled to the standard induction coil of the telephone apparatus.

These and other objects and features of my invention will be apparent from the following description and the appended claims.

In the description of my invention reference is had to the accompanying drawings, of which:

Figure 1:
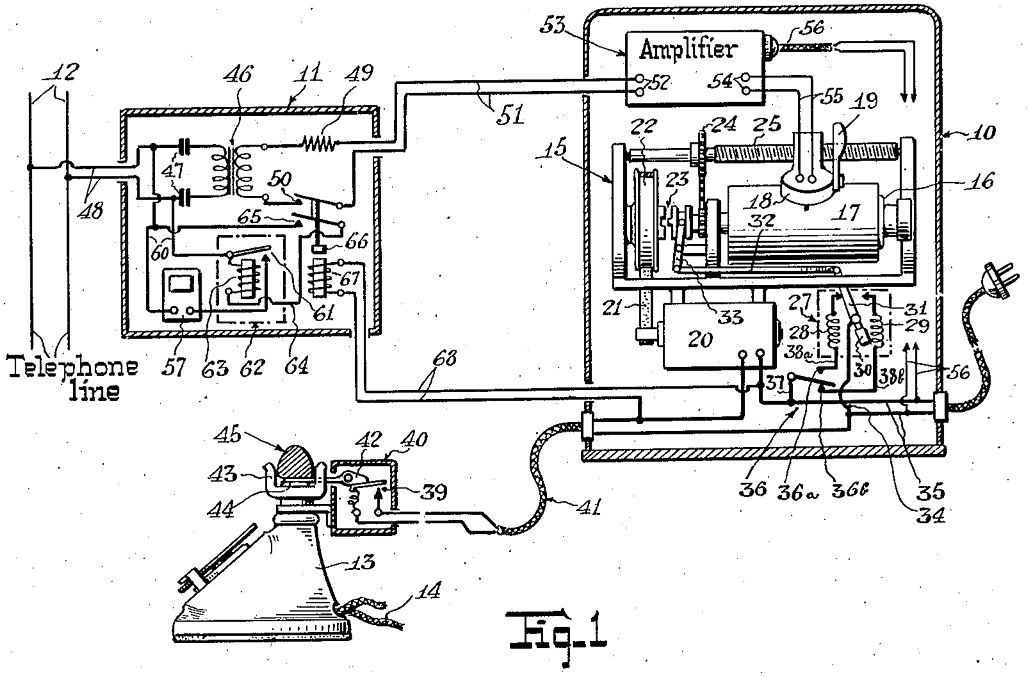
Figure 1 is a view of circuits and mechanism showing one embodiment of my invention which employs a warning signal on a telephone line while the conversations on the line are being recorded.

The embodiment of my invention shown in Figure 1 comprises a phonographic machine 10 for recording conversations transmitted on a telephone system, and an adapter unit 11 for connecting the recording machine to the telephone system and for signaling the users of the telephone system when their conversations are being recorded. The telephone system is illustrated as comprising a telephone line 12 and a desk-type hand combination telephone set 13 which is connected in the usual way into the telephone system by cords 14. In the present embodiment the telephone 13 is considered as being the one used by the operator who desires to record his telephone conversations; accordingly, this telephone is coupled with the recording machine so that the latter is put automatically into operation as the telephone is used, as will hereinafter appear.

The recording machine 10 is preferably of a dictating machine type well known in the art. It may comprise a frame 15 carrying a journaled support 16 for a record 17 (shown by way of example as a mandrel-type support for a cylindrical record). Mounted on the frame for traveling movement across the record is a record-cooperating translating device 18. This translating device has the usual control lever 19 by which the device is shifted into neutral and recording positions in relation to the mounted record. The record support is driven by a motor 20 which is coupled by a belt 21 to a pulley 22. This pulley is in turn coupled to the record support by a clutch 23. Also driven by the motor through gearing 24 coupled to the record support is a feed screw 25 for moving the translating device across the record. This translating device is releasably coupled to the feed screw by means well known in the art which need not be herein described, it being only necessary to state that this coupling means is controlled by the lever 19 so that the coupling is in effective condition when the translating device is in a recording condition and is released when the device is in a neutral condition.

The clutch 23 is preferably operated by an electro-magnetic device 27 of the type disclosed in Langley Patent No. 1,380,486. This device comprises start and stop coils 28 and 29 and an armature 30 carrying a switch pole member 31 which contacts the stop coil when the start coil is energized, and vice versa. The armature 30 is connected to a link 32 and this link is in turn connected to a lever 33 which is pivoted to the frame 15 and coupled to the movable element of the clutch. The control circuits for the clutch-actuating device comprise a lead 34 from the pole 31 to one side of a power line 35, a single-pole double-throw switch 36, a lead 37 from the pole of this switch to the other side of the power line 35 and leads 38*a* and 38*b* from the stationary contacts 36*a* and 36*b* of this switch to the start and stop coils respectively.

The placing of the phonographic recording machine into effective condition involves producing record rotation while the translating device is in recording condition and is connected operatively through the amplifier to the telephone line. In the present embodiment I place the phonograph in effective condition by starting record rotation and concurrently connecting the phonographic translating device to the telephone line. Obviously, this record rotation may be started in several ways: (1) the clutch may be left engaged while the recording machine is on stand-by for telephone recording and the motor may then be started when the recording operation is to begin; (2) the motor may be left running while the machine is on stand-by and the clutch then engaged when the recording operation is to begin; and (3) the motor may be idle and the clutch disengaged during stand-by and the motor may then be started and the clutch also engaged when the recording is to begin. Preferably, I employ the first of these different methods and do herein next so describe my invention.

The motor 20 is connected to the power line 35 by way of a switch 39 mounted in a box 40 that is supported by the housing of the telephone 13, the switch being connected to the motor circuit by a cord 41. This is a single-pole single-throw switch comprising a pivoted arm 42 carrying insulatedly the pole member of the switch. The arm extends into the cradle 43 of the telephone set and overlies the plunger 44 of the telephone switch. When the handpiece 45—which includes the telephone microphone and receiver—rests in the cradle the plunger is held down and the switch 39 is held open, as shown, but when the handpiece is removed the plunger is moved upwardly by the standard plunger spring within the telephone set to cause the switch 39 to be closed and the motor to be started. When the recording machine is on stand-by, the clutch 23 is engaged by any suitable means as by suitably retaining the switch 36 in "start" position; thus the starting of the motor which occurs as an incident of removing the handpiece from the cradle causes the record to be put in rotation.

In the adapter unit 11 there is a transformer 46 for connecting the phonographic translating device to the telephone system. One winding of this transformer is connected through a pair of blocking condensers 47 to leads 48 which connect to the telephone line 12, and the other winding of this transformer is connected through a resistor 49 and switch 50 to leads 51 which connect to the input 52 of an electronic amplifier 53 that is a part of the recording mechanism. The output 54 of this amplifier is connected by leads 55 to the translating device 18. The amplifier receives its electrical power through a cable 56 which connects to the power line 35.

In the unit 11 there is a signaling means and a control means therefor which is arranged to put the signaling means into operation concurrently as the recording mechanism is placed in effective condition. The signaling means comprises an interrupter 57 which is serially included in a circuit 60 that is connected across the telephone line 12 by way of the leads 48. This circuit 60 also includes a normally-open switch 61 of a relay 62. This relay is of a type which has a long operate time, say fifteen seconds, and a relatively short release time, say one second or less, so that the interrupter is connected to the telephone line during only a moment of each fifteen-second interval. During that moment the interrupter is energized by the D.-C. voltage on the telephone line to produce a warning signal in the telephone system. This signal is chosen in respect of its frequency and volume level so that it will be readily audible on the telephone line but will not be loud enough or of such character as to be annoying to the telephone users or to interfere substantially with the intelligibility of the telephone conversations.

The relay 62 may be of the oil-dashpot variety such as type Series DDC of the Automatic Electric Company. Such a relay has an actuating coil 63 which may also be energized from the telephone line. This coil 63 is connected accordingly in a circuit 64 across the circuit 60 abovementioned. In the circuit 64 there is however a control switch 65 which serves as an on-off switch for the signaling means. For instance, when the switch 65 is open the coil 63 is not energized, the relay switch 61 is open and the interrupter 57 is idle. When the switch 65 is closed the relay switch 61 is closed intermittently so that the interrupter will produce an intermittent warning signal as above described.

The pole members of the switches 50 and 65 are connected to an armature 66 of a relay including an actuating coil 67. This coil is connected by leads 68 and the switch 39 above described to the power line 35. When the handpiece 45 of the telephone set is raised from the cradle 43 the relay coil 67 is energized to connect the translating device operatively to the telephone line and to place the signaling means into operation. Since record rotation is started at the same time, it will be understood that the recording machine is put into effective condition concurrently as the signaling means is rendered effective.

Figure 2:
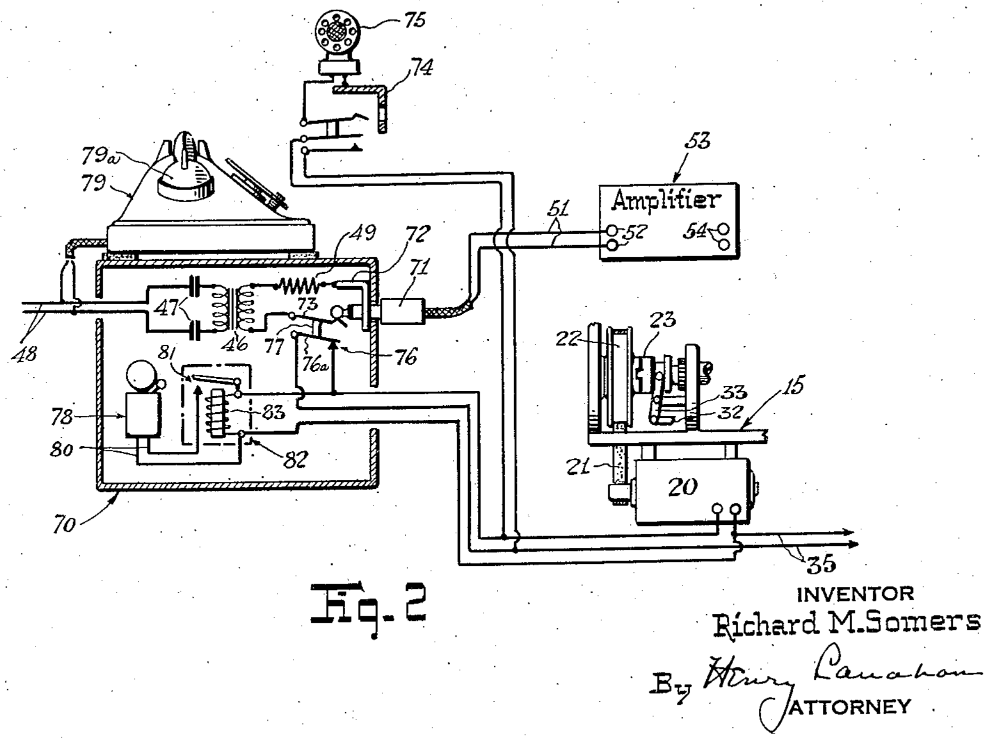
Figure 2 is a view showing a second embodiment of my invention.

In Figure 2 there is shown a second embodiment of my invention wherein the signaling means is placed into effective condition as an incident of selectively connecting a phonographic dictating machine to a telephone line, and wherein the warning signal originates from a sound source in the vicinity of the telephone set and is picked up by the telephone microphone while the telephone is in use. In this embodiment, parts which are identical with the corresponding parts of the foregoing embodiment are given the same reference characters.

In this second embodiment record rotation is again controlled by an on-off switch for the motor 20, it being considered that the clutch 23 is engaged while the recording machine is on stand-by for telephone recording. Also, the circuit for connecting the phonograph to the telephone line includes again the leads 48, condensers 47, transformer 46, resistance 49 and leads 51, of which the elements 48, 47, 46 and 49 are included in an adapter unit 70 corresponding to the unit 11 of the foregoing embodiment. The leads 51 are however detachably connected to the unit 70 by a plug 71 and a jack 72 of which the latter is mounted on the unit 70 and the former is connected to the leads. One side of a winding of the transformer 46 is connected through the resistance 49 to the jack 72 and the other side of this winding is connected to a contact member 73 which is a part of the jack 72. When the plug 71 is inserted into the jack the tip of the plug engages the contact member 73 to connect the phonographic translating device to the telephone line.

The recording machine may be conditioned alternatively for dictation recording by removing the plug 71 from the jack 72 and connecting it to a jack 74 of a suitable dictation microphone 75.

In the adapter unit 70 there is a normally-open switch 76 including a pole member 76a which is connected insulatedly at 77 to the contact member 73. As the plug 71 is inserted into the jack 72 to connect the recording machine to the telephone line the switch 76 is closed. This switch is connected serially in the power line 35 to the motor 20. Thus as the recording machine is connected to the telephone line the motor is automatically started to place the record in rotation.

Preferably included also in the unit 70 is an electric signaling device 78 for producing a warning sound. A telephone set 79 of the telephone system is placed on or in the vicinity of the unit 70 so that during operation of the telephone the hand microphone 79a will pick up the warning sound and impress it on the telephone line. This signaling device is connected in a power circuit 80 which serially includes a switch 81 of a relay 82. This relay, like the relay 62 above described, has a long operate time and a relatively short release time. The relay may for example be of an oil-dashpot type adapted for operation from an A.-C. line such as type Series DAC of the Automatic Electric Company. This circuit 80 and the actuating coil 83 of the relay 82 are connected through the switch 76 to the power line 35 so that power is supplied to the signaling means only while the plug 71 is connected to the jack 72. Since the switch 76 is closed to start record rotation as the plug is so connected to the jack, it will be understood also that in this second embodiment the signaling means is put into operation concurrently as the phonograph is rendered effective to record telephone conversations.

Figure 3:
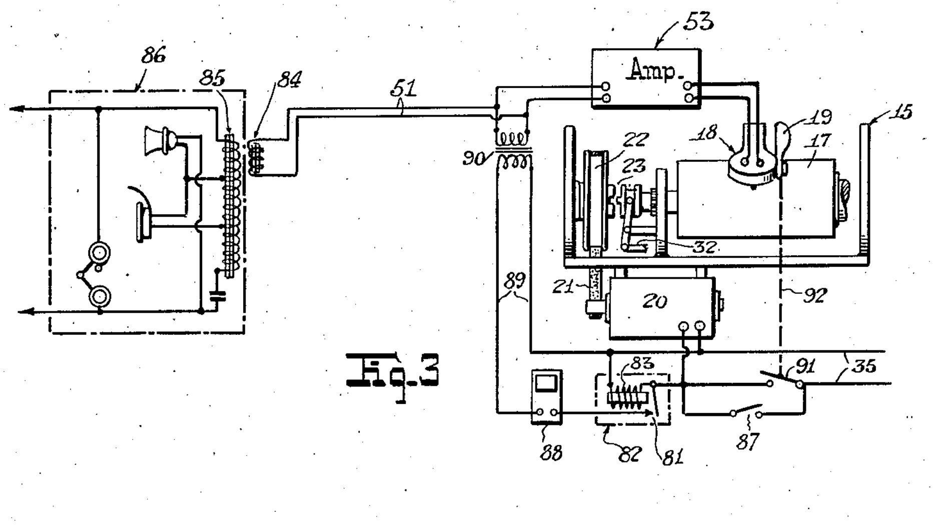
Figure 3 is a view showing a third embodiment of my invention.

In the embodiment of Figure 3 the input of the phonograph amplifier 53 is connected through the cable 51 to a pickup coil 84 such, for example, as that disclosed in the Adams Patent No. 2,381,-097 having a common assignee with the present application. This pickup coil is placed adjacent to the standard induction coil 85 of a telephone system 86 so as to be electromagnetically coupled thereto. Through this coupling the voice currents on the telephone line are fed to the amplifier from whence they are fed to the translating device 18 and recorded on the record 17. This record is again driven by the motor 20 by way of the belt 21, pulley 22 and clutch 23. The motor is connected in the power line 35 through an on-off control switch 87. Record rotation may be controlled manually either by the switch 87 or by the clutch 23, it being understood that the latter is controlled manually by a suitable means as described in my first embodiment.

The signaling means in this third embodiment comprises an interrupter 88 connected in a circuit 89 which is coupled by a transformer 90 to the leads 51 running to the pickup 84. The circuit 89 is connected to the power line 35 and serially includes the switch 81 of the relay 82 above described as well as a control switch 91. Also, the actuating coil 83 of the relay 82 is connected to the power line 35 through the control switch 91. Since this switch 91 controls the power to the signaling system it constitutes an on-off switch for placing the signaling system into and out of operation.

During stand-by of the recording machine for telephone recording, the amplifier 53 is coupled to the telephone system and the record 17 is rotating; however, the translating device is normally left in a neutral position. When it is desired to record from the telephone line the translating device 18 is shifted into recording position by the lever 19. In order that the signaling means will be rendered effective concurrently as the recording machine is put into operation, the switch 91 is coupled by mechanical means 92 (diagrammatically shown) to the lever 19 so that this switch will be closed as the translating device is placed in recording position and opened as the device is returned to neutral position. When the signaling means is thus put into operation, it feeds a warning signal over the line 51 to the pickup coil, which signal is impressed on the telephone line in view of this pickup coil being closely magnetically coupled to the induction coil 85 of the telephone system.

Figure 4:
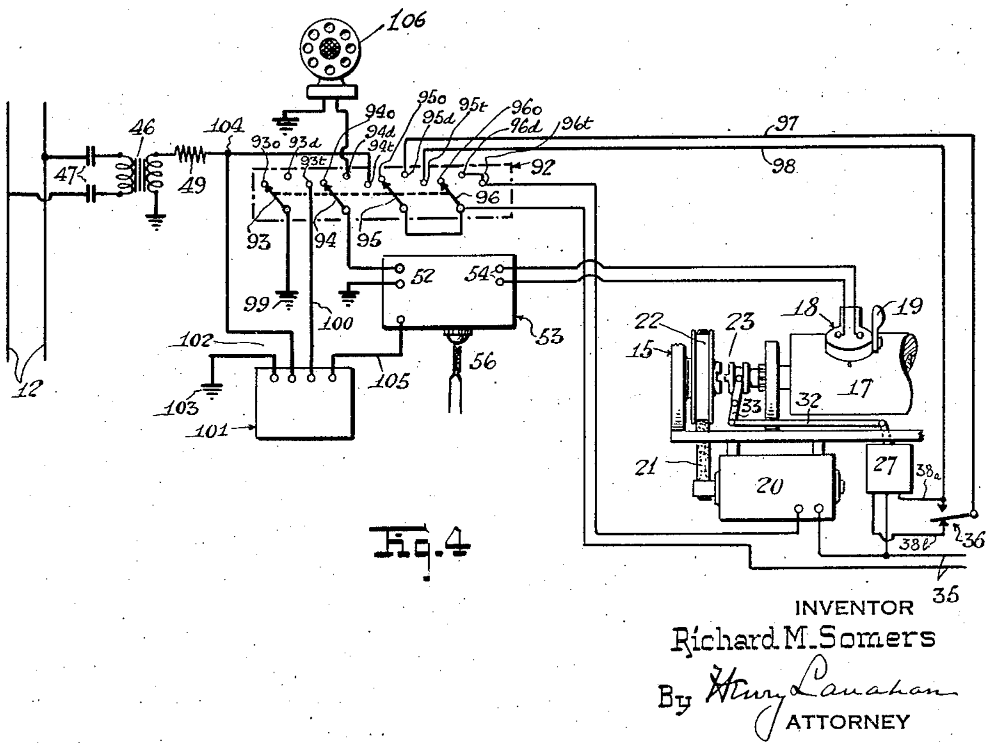
Figure 4 is a view illustrating an alternative form of my second embodiment shown in Figure 2.

In Figure 4 there is shown diagrammatically an embodiment which is a modification of my second embodiment shown in Figure 2. In this modified embodiment, all necessary control operations are produced by throwing a unitary multiple switch 92. This switch has a neutral position, a second position for dictation recording and a third position for telephone recording. The switch comprises four pole members 93, 94, 95 and 96 which are mechanically interconnected for simultaneous operation but are electrically insulated from one another. Associated with each of these pole members are three contacts referred to by the reference numeral of the respective pole member with the suffix letters *o*, *d* and *t*. For example, associated with the pole member 93 are the contacts **93*o*, 93*d* and 93*t***. The contacts with the suffix letter *o* are all idle and are engaged by the respective pole members when the switch 92 is in neutral position. The contacts with the suffix letter *d* are contacted by the respective pole members when the switch 92 is in a dictation-recording position and the contacts with the suffix letter *t* are contacted by the respective pole members when the switch 92 is in a telephone-recording position.

The pole 94 is connected to the input 52 of the electronic amplifier 53, and the associated contacts **94*d* and 94*t* are connected respectively to a dictation microphone 106 and to the telephone-coupling transformer 46. These dictation- and telephone-recording sources are selected as the switch 92** is thrown into respective dictation- and telephone-recording positions.

The pole 96 is connected to one side of the power line 35 and the associated contacts **96*d* and 96*t* are tied together and connected to one of the terminals of the motor 20, the other terminal of the motor being connected to the other side of the power line 35. Thus, the pole 96 and associated contacts serve as a motor switch to start the motor as the switch 92** is thrown into dictation- and telephone-recording positions.

The pole 95 is connected also to one side of the power line 35. The associated contact **95*d* is connected by a lead 97 to the pole of the clutch-control switch 36, and the contact 95*t* is connected by a lead 98 to the lead 38*a* running to the start coil of the clutch-actuating device 27. The pole of switch 36 is normally closed with the lead 38*b* that runs to the stop coil of the device 27 and thus contact 95*t* is normally connected to the stop coil. When the switch 92 is in dictation-recording position, power is made available to the pole of the switch 36. The clutch 23 is now under the control of this switch and, accordingly, upon throwing the switch 36 from its normal stop position to a start position the start coil is energized to engage the clutch. Vice versa, upon releasing the switch 36 the stop coil is energized to disengage the clutch. When the switch 92** is thrown however to telephone-recording position, power is supplied directly to the start circuit of the clutch-actuating device 27 by way of the pole 95, contact 95t, lead 98, and lead 38a so as to cause engagement of the clutch. Since the motor is started by the pole 96 when the switch 92 is thrown into telephone-recording position, this engagement of the clutch 23 will cause the record to be started.

The pole 93 of the switch 92 is grounded at 99. The associated contact 93d is idle but the contact 93t is connected by a lead 100 to a signaling device 101. This signaling device may comprise the interrupter 57 and relay 62 connected as illustrated in Figure 1 or it may comprise any suitable electronic signaling means adapted to produce intermittent signals of suitable frequency. In either case, it may have an output circuit 102 of which one lead is grounded at 103 and the other is connected to the telephone line at 104, and it may have a power-supply circuit comprising a lead 105 connecting to the "B" supply in the amplifier 53 and another lead which is the lead 100 abovementioned. Accordingly, when the switch 92 is in neutral and dictation-recording positions, the signaling device 101 is not in operation but when the switch is thrown to a telephone-recording position the signaling device is automatically put into operation.

From the foregoing description it will be understood that when the switch 92 is thrown to dictation-recording position the dictation microphone is connected to the phonograph amplifier, the motor is started and the clutch 23 is put under the control of the start-stop switch 36. When the switch 92 is thrown to telephone-recording position, the telephone line is connected to the phonograph amplifier, the motor is started, the clutch is engaged and the signaling device is put automatically into operation.

The embodiments of my invention herein particularly described are intended to be illustrative and not limitative of my invention as the same are subject to changes and modifications without departure from the scope of my invention which I endeavor to express according to the following claims.

I claim:

1. In combination with a telephone system including a station having a hand microphone and a support for holding said microphone when the same is not in use: a phonographic mechanism for recording speech transmitted over said telephone system; control means at said station adapted for placing said phonographic recording mechanism into effective condition irrespective of the condition of the telephone system beyond said station, said control means being associated with said support to cause the same to be operated as an incident of removing said hand microphone therefrom; and a warning signaling means controlled by said control means to cause a warning signal to be fed into said telephone system only when said hand microphone is removed from said support.

2. In combination with a telephone system including a station having a hand microphone and a support for holding said microphone when the same is not in use: a phonographic mechanism for recording speech transmitted over said telephone system, said phonographic recording mechanism including a rotatable carrier for a record and a record-cooperating translating device placeable selectively into recording and neutral conditions in relation to a record mounted on said carrier; control means at said station adapted for placing said translating device into recording condition irrespective of the condition of the telephone system beyond said station; and a warning signaling means operatively coupled to said control means to cause a warning signal to be fed into said telephone system whenever said translating device is in recording condition.

3. In combination with a telephone system including a station having a hand microphone and a support for holding said microphone when the same is not in use: a phonographic mechanism for recording speech transmitted over said telephone system; control means at said station adapted for placing said phonographic recording mechanism into effective condition irrespective of the condition of the telephone system beyond said station; and a sound signaling means, rendered effective by said control means as the same is operated to render said recording mechanism effective, for transmitting a sound signal to said hand microphone to be picked up thereby and fed into said telephone system when the hand microphone is off said support.

4. In combination with a telephone system: a phonographic mechanism for recording speech transmitted over said telephone system; a plug-jack connector for connecting said recording mechanism to said telephone system; a signaling means adapted for feeding a warning signal to said telephone system while the system is in use; and an electrical control device electrically independent of said telephone system and mechanically associated with said jack and moved by said plug as the latter is inserted into said jack for rendering said signaling means operative and for concurrently starting operation of said recording mechanism.

RICHARD M. SOMERS.

REFERENCES CITED

The following references are of record in the file of this patent:

UNITED STATES PATENTS

| Number | Name | Date |
|---|---|---|
| 1,548,028 | Egerton | Aug. 4, 1925 |
| 1,780,919 | Holland | Nov. 11, 1930 |
| 1,845,034 | Bickelhaupt | Feb. 16, 1932 |
| 2,005,788 | Keiser | June 25, 1935 |
| 2,278,828 | Chiardia | Apr. 7, 1942 |
| 2,319,665 | Dobrzensky | May 18, 1943 |